(No Model.) 2 Sheets—Sheet 1.
I. N. BOOTH & E. HUGHES.
TROUGH FOR FEEDING SALT TO LIVE STOCK.
No. 355,967. Patented Jan. 11, 1887.
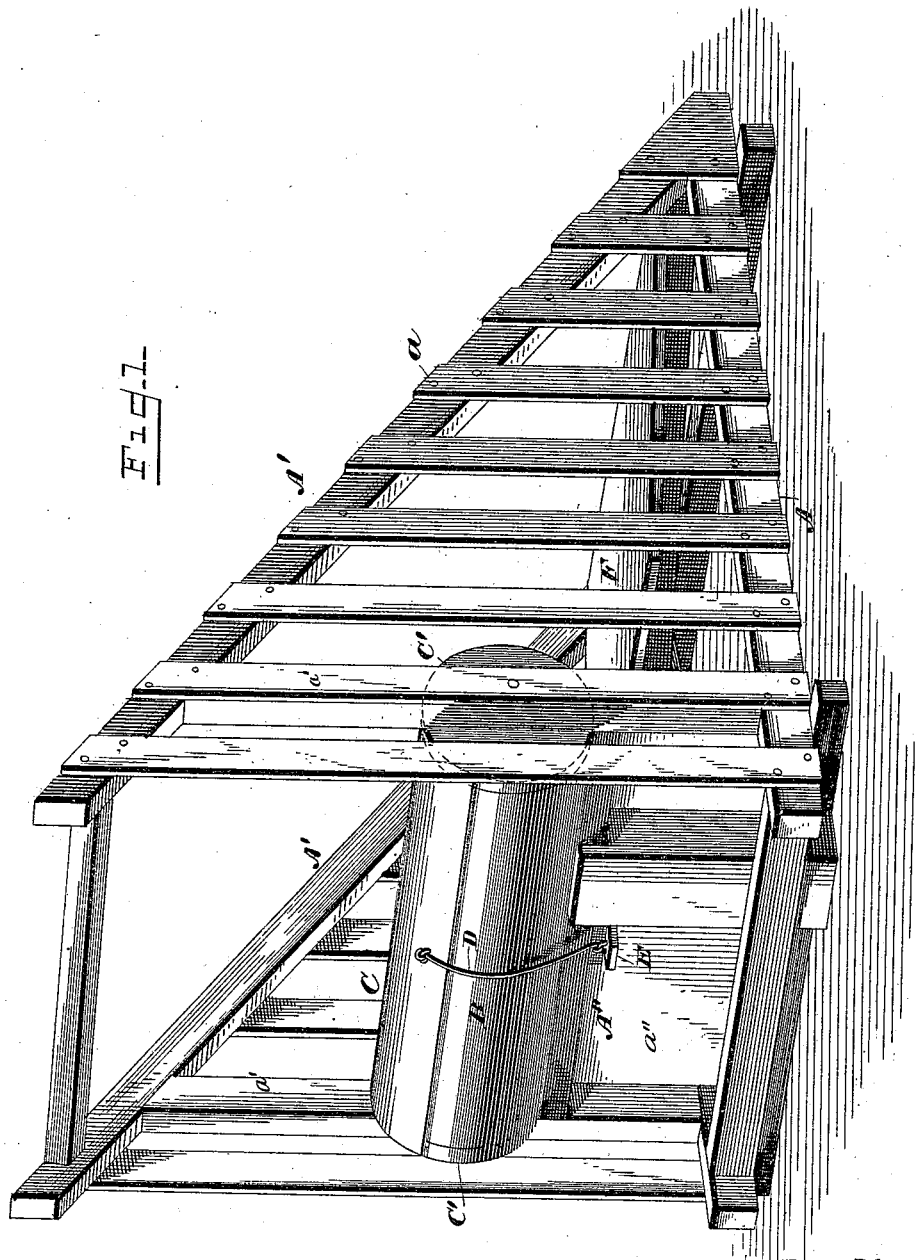
WITNESSES
Isaac N. Booth and
Edward Hughes.
INVENTOR
Attorney

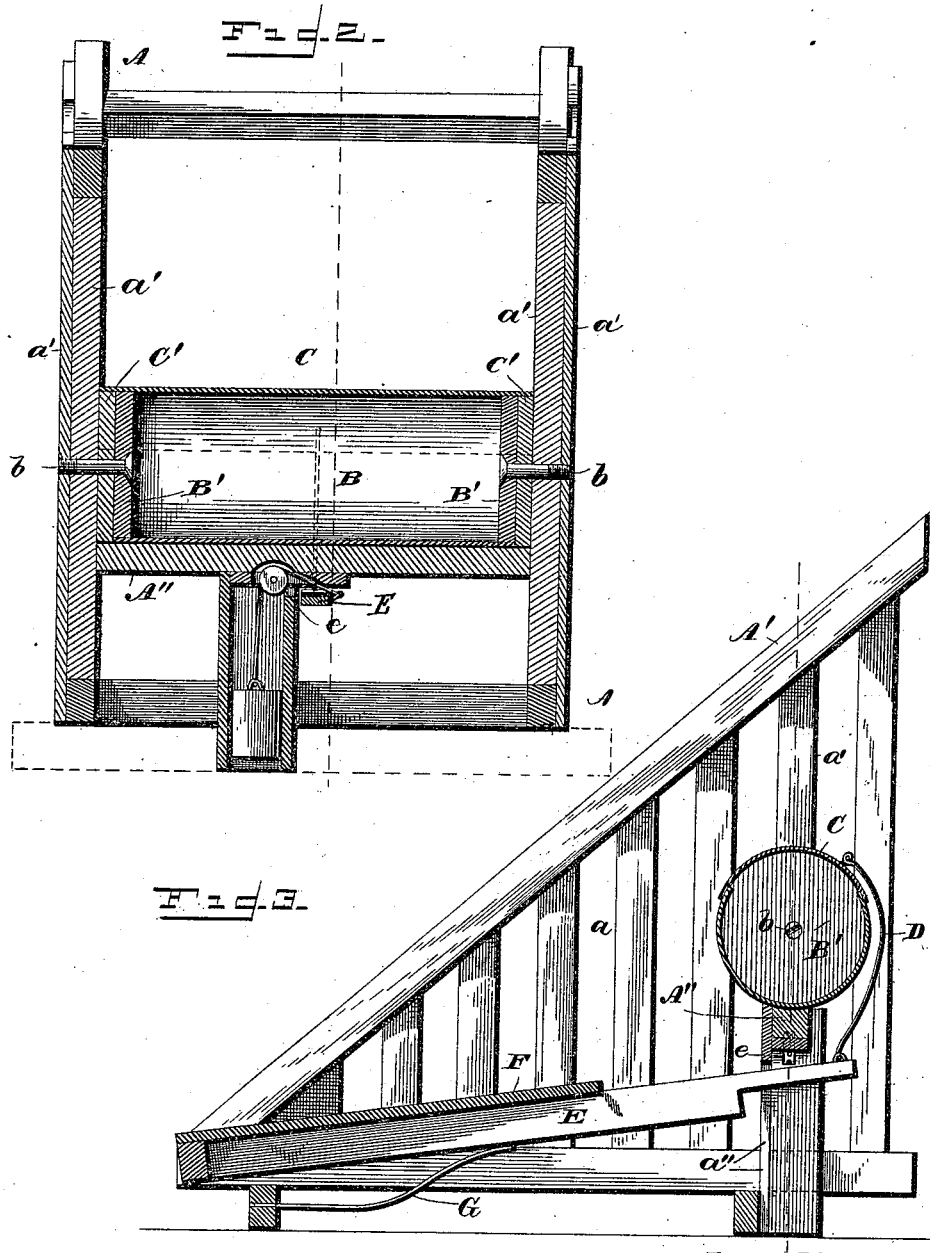

UNITED STATES PATENT OFFICE.

ISAAC N. BOOTH AND EDWARD HUGHES, OF WEST CONCORD, MINNESOTA.

TROUGH FOR FEEDING SALT TO LIVE STOCK.

SPECIFICATION forming part of Letters Patent No. 355,967, dated January 11, 1887.

Application filed October 28, 1886. Serial No. 217,455. (No model.)

*To all whom it may concern:*

Be it known that we, ISAAC N. BOOTH and EDWARD HUGHES, citizens of the United States of America, residing at West Concord, in the county of Dodge and State of Minnesota, have invented certain new and useful Improvements in Troughs for Feeding Salt to Live Stock; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention relates to certain new and useful improvements in troughs for feeding salt to live stock, the object of said invention being to provide a trough with a movable cover which will be automatically removed from the trough proper, so as to leave the same uncovered when an animal or weight is applied to a pivoted platform which is connected to said cover; and our invention consists in the construction and combination of the parts, as will be hereinafter fully set forth, and specifically pointed out in the claims.

In the accompanying drawings, which illustrate our invention, Figure 1 is a perspective view of a trough and platform, showing the same in a position for use. Fig. 2 is a vertical sectional view, and Fig. 3 is a transverse sectional view taken through the line *x x* of Fig. 2.

A is a suitable base frame, to which is attached inclined beams A', which are connected to the horizontal base beam by vertical slats *a*, so as to form a portable structure.

B is the trough proper, which is preferably a part of a cylinder in cross-section, the upper portion thereof being cut away. This trough is attached to the vertical side bars, *a'*, of the frame by bolts *b*, and the same may also be attached at its underside to a transverse beam, A'', from which extend vertical bars *a''*. The trough B is preferably made of sheet metal, and is provided with heads or ends B'.

C is a segmental cover, which is provided with circular end pieces, C', with central perforations through which pass the bolts *b*, so that the cover will turn thereon, and said cover is connected by a metallic bar, D, to the end of the central beam, E, of the platform F, said beam extending so as to be on a line beyond the pivots of the cover.

The platform F is pivotally secured to the main frame, and beneath the same is attached a flat spring, G, which bears upon the central beam, E, thereof, so as to elevate the platform, and near the end of the beam E is secured a cord or rope which passes over a pulley, *e*, the opposite end of said cord having a weight attached thereto, said weight also serving to elevate the upper end of the beam E.

The bar D has suitable eyes formed in its ends, which engage with staples or other suitable connecting means attached to the cover C of the trough and to the end of the beam E. The beam E projects through a slot in the vertical wall, formed by bars *a* under the trough, and when the same is depressed to its full extent it will bear upon one of the cross-beams of the main frame. If desirable, the weight may be inclosed in a suitable box.

The operation of our invention is as follows: When an animal steps upon the platform, it will depress the same, its weight overcoming the combined resistance of the weight and spring, and when said platform is depressed the cover will slide to the rear of the trough, so that it can have access to the contents thereof. As soon as the animal leaves the platform the cover will swing over the opening in the trough automatically.

By providing the cover with the circular end pieces the top can be of sufficient length to completely cover the longitudinal opening in the trough, so that rain cannot beat into the ends thereof, and the same bolts serve to hold the trough and cover in place.

The trough may be used for feeding other materials than salt to live stock.

We claim—

1. The combination, with a trough for feeding live stock, of a pivoted cover, a pivoted platform, a beam attached to the platform, a rigid bar connected to the rear portion of said cover and to the end of the beam, and a device for automatically elevating said platform to move the cover over the opening in the trough, substantially as described.

2. The combination, with a trough for feeding live stock, of a pivoted cover, having cylindrical ends, bolts $b\ b$ for holding the trough in position and forming pivoted bearings for the cover, a metallic bar, D, connected to the cover and to the end of the beam attached to a pivoted platform, and a spring for elevating said platform, substantially as shown, and for the purpose set forth.

3. The combination, in a device for feeding live stock, of a frame having a platform pivotally attached thereto, a trough rigidly secured to the frame above the platform and provided with a curved cover which is pivoted centrally to the opposite heads of said trough, a metallic bar, D, connected to the rear portion of the cover of the trough and to the front end of a beam, E, and means for automatically elevating the platform, substantially as shown, and for the purpose set forth.

In testimony whereof we affix our signatures in presence of two witnesses.

ISAAC N. BOOTH.
     EDWARD HUGHES.

Witnesses:
 T. J. DYKES,
 M. M. SEMMS.